United States Patent [19]
Dozois

[11] 3,713,472
[45] Jan. 30, 1973

[54] VEHICLE CLOSURE SYSTEM

[75] Inventor: James H. Dozois, Harper Woods, Mich.

[73] Assignee: General Motors Corporation, Detroit, Mich.

[22] Filed: Nov. 17, 1971

[21] Appl. No.: 199,660

[52] U.S. Cl. ............160/189, 49/40, 49/139, 49/280, 49/340, 296/56
[51] Int. Cl. ..............................E05f 15/12
[58] Field of Search....49/40, 41, 139, 140, 280, 340; 296/50, 56, 57; 74/625; 160/188, 189

[56] References Cited

UNITED STATES PATENTS

| | | | |
|---|---|---|---|
| 2,833,536 | 5/1958 | Joachim et al. | 49/139 |
| 3,081,078 | 3/1963 | Lohr | 49/139 |
| 3,422,572 | 1/1969 | Pollak | 49/340 X |

Primary Examiner—J. Karl Bell
Attorney—W. E. Finken et al.

[57] ABSTRACT

A station wagon tailgate type vehicle closure system operable in a randomly interchangeable manner in either one of a power mode and a manual mode, the system including a closure, an operator movable from a center position in opening and closing directions, a pin and slot connection between the closure and the operator effecting movement of the closure in the power mode during movement of the operator in either direction away from the center position while permitting lost motion between the closure and the operator during movement of the operator back to the center position, the lost motion also permitting movement of the closure in the manual mode when the operator is in the center position, a manual switch for energizing a motor adapted to drive the operator in either direction away from the center position, a reversing and stopping circuit responsive to deactuation of the manual switch for temporarily energizing the motor to return the operator to the center position, a striker mounted on the vehicle and movable between a center position and an extended position synchronously with movement of the operator, and a latch assembly on the closure engageable on the striker. When the operator is in the center position the striker is in its center position and the closure is movable in the normal manual mode. When the operator is actuated to move the closure toward a closed position the striker moves to the extended position for engagement with the latch assembly whereafter the striker during movement back to the center position pulls the closure to a fully closed position synchronously with movement of the operator back to its center position.

2 Claims, 12 Drawing Figures

INVENTOR.
James H. Dozois
BY
Saul Schwartz
ATTORNEY

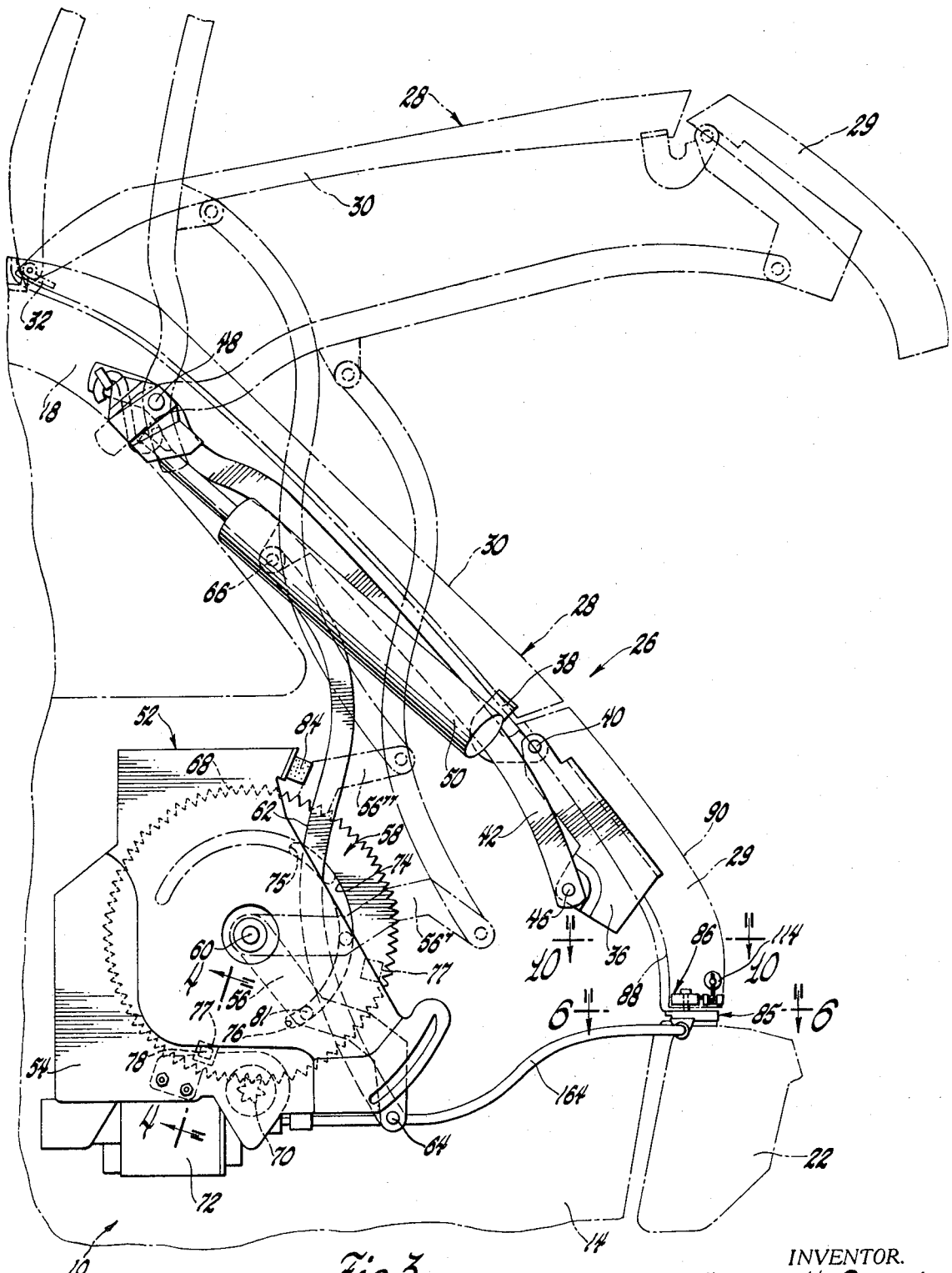

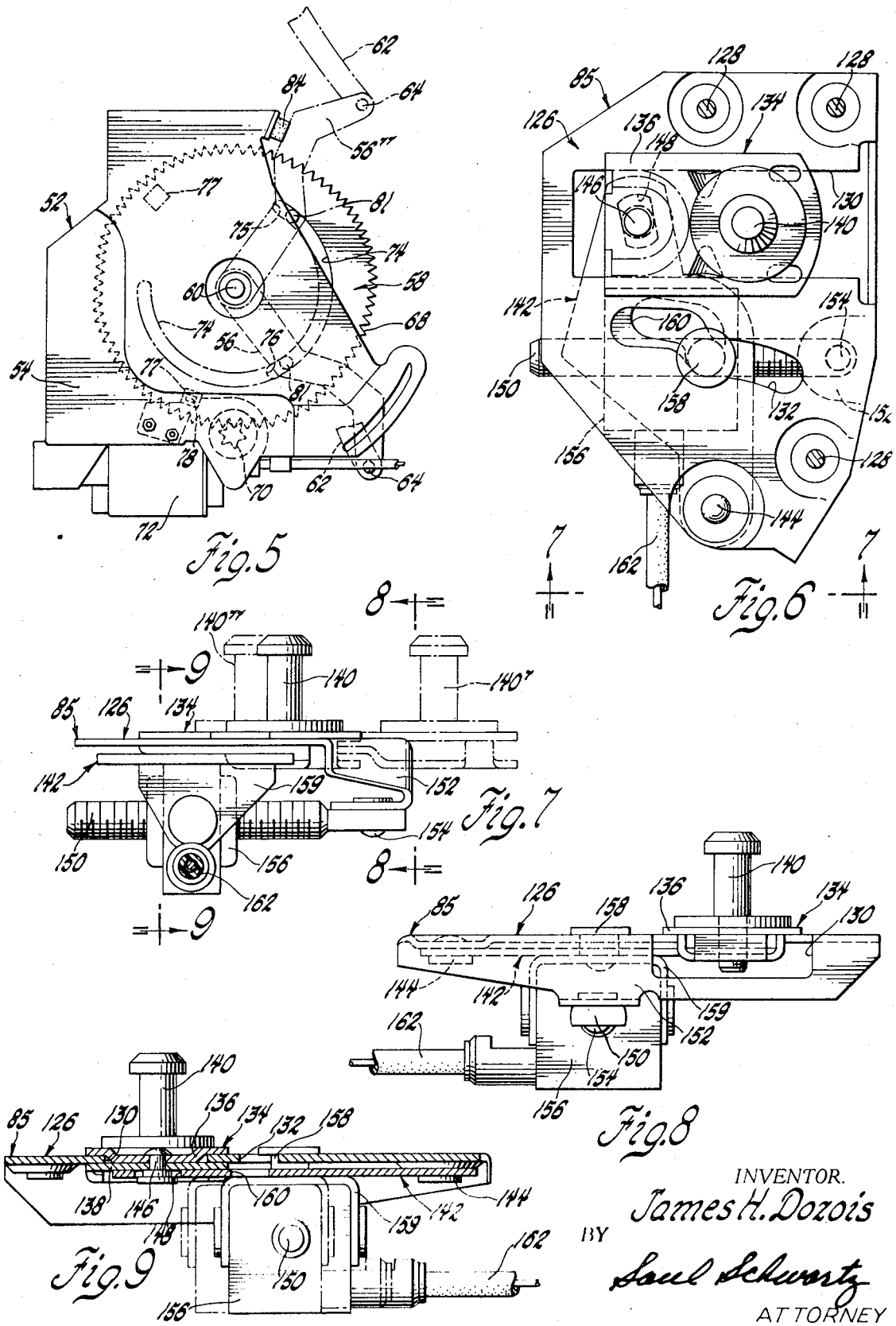

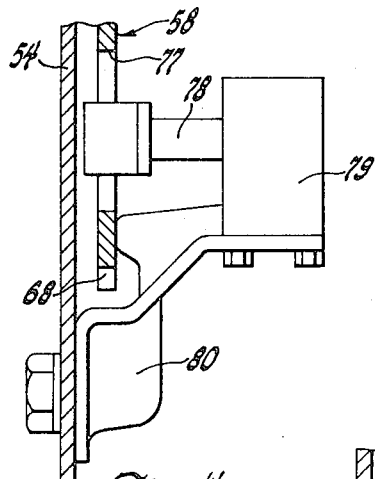
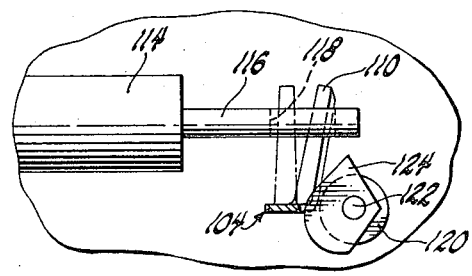
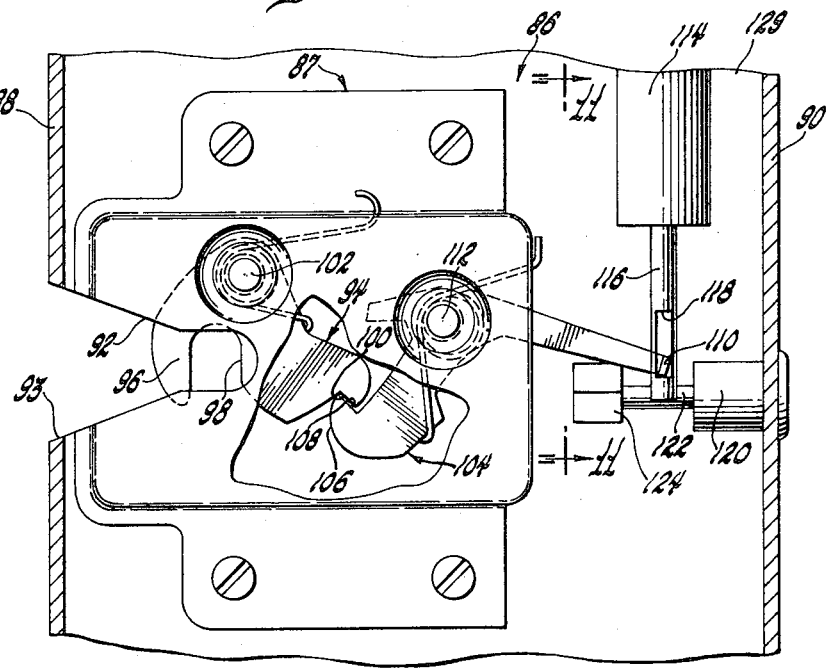
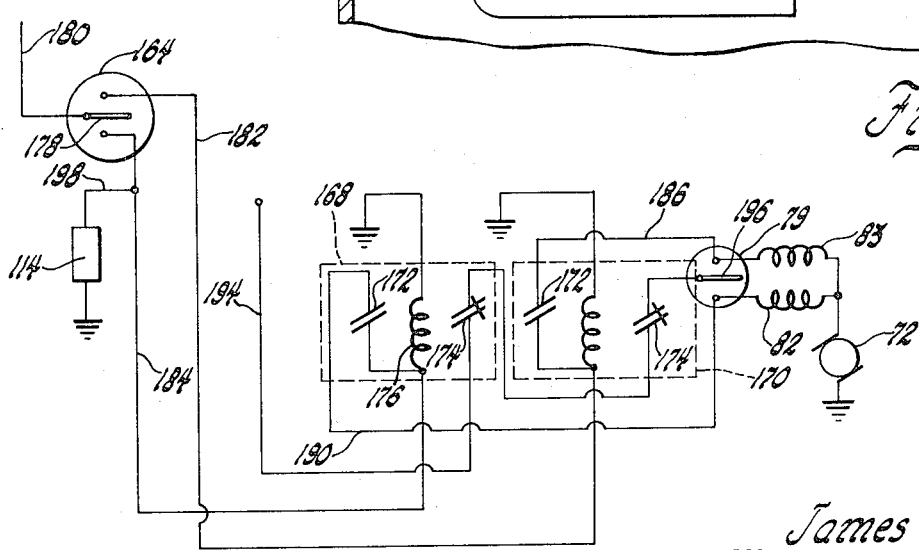

VEHICLE CLOSURE SYSTEM

This invention relates generally to vehicle body closure systems and more particularly to a system including a station wagon tailgate type closure adapted for operation in a power mode and in a manual mode.

When designing vehicle body closure systems of the station wagon tailgate type, automotive engineers consider the problem of tailgate operation in confined spaces, such as when the vehicle is parallel parked, and attempt to reduce or eliminate the problem by providing a tailgate and supporting linkage arrangement which requires minimum operating space. These engineers also recognize the fact that a tailgate system having an automatic or power operating mode is more desirable to potential users than a similar system adapted for operation only in a manual mode because of the reduced effort required to manipulate the tailgate in the power mode. Providing a power operating mode for the tailgate, however, multiplies the design problems for the engineers because they must provide a more complicated system which is still economical to manufacture and install and which is capable of tightly sealing the tailgate in a closed position. Further, recognizing that there are situations where the operator may desire manual operation of the tailgate, the engineers must provide a system wherein the operator has the option of manipulating the tailgate in either the manual mode or the power mode. A vehicle closure system according to this invention fulfills each and every one of the requirements noted hereinbefore and represents an improvement over similar installations heretofore known.

Accordingly, the primary feature of this invention is that it provides a new and improved vehicle closure system, the closure system being particularly adapted for station wagon type vehicle bodies. Another feature of this invention is that it provides a new and improved closure system capable of operation in a manual mode and a power mode with random interchangeability therebetween. Yet other features of this invention reside in the provision in the closure system of a two section tailgate assembly pivotally supported on the body and adapted to close the opening in the body in a closed position and to swing out of the opening to a folded configuration in an open position and in the provision of a closure operator assembly and a striker assembly each adapted to remain quiescent during operation of the tailgate in the manual mode and to move synchronously during movement of the tailgate in the power mode. A still further feature of this invention resides in the provision of an electric motor drive for the operator and striker assemblies and a control circuit adapted to effect cyclical operation of each assembly so that each assembly always returns to a center position permitting operation of the tailgate in the manual mode after a power mode cycle.

These and other features of this invention will be readily apparent from the following specification and from the drawings wherein:

FIG. 3 is an enlarged sectional view taken generally along the plane indicated by lines 3—3 in FIG. 1;

FIG. 4 is an enlarged sectional view taken generally along the plane indicated by lines 4—4 in FIG. 3;

FIG. 5 is a view of a portion of FIG. 3 showing the closure operator assembly;

FIG. 6 is an enlarged sectional view taken generally along the plane indicated by lines 6—6 in FIG. 3;

FIG. 7 is a view taken generally along the plane indicated by the lines 7—7 in FIG. 6;

FIG. 8 is a view taken generally along the plane indicated by lines 8—8 in FIG. 7;

FIG. 9 is a sectional view taken generally along the plane indicated by lines 9—9 in FIG. 7;

FIG. 10 is an enlarged sectional view taken generally along the plane indicated by lines 10—10 in FIG. 3;

FIG. 11 is a view taken generally along the plane indicated by lines 11—11 in FIG. 10; and FIG. 12 is a schematic diagram of the electrical control circuit for the closure system according to this invention.

Figure 1:
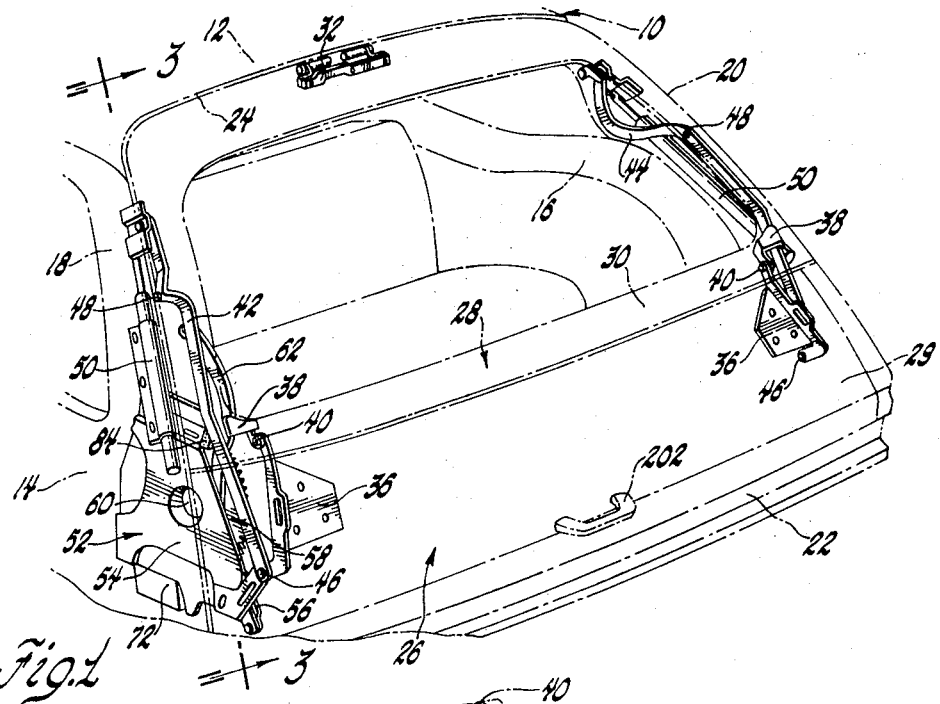
FIG. 1 is a fragmentary perspective view of the rear portion of a station wagon type vehicle body having a closure system according to this invention, the system being shown in a closed configuration.
Figure 2:
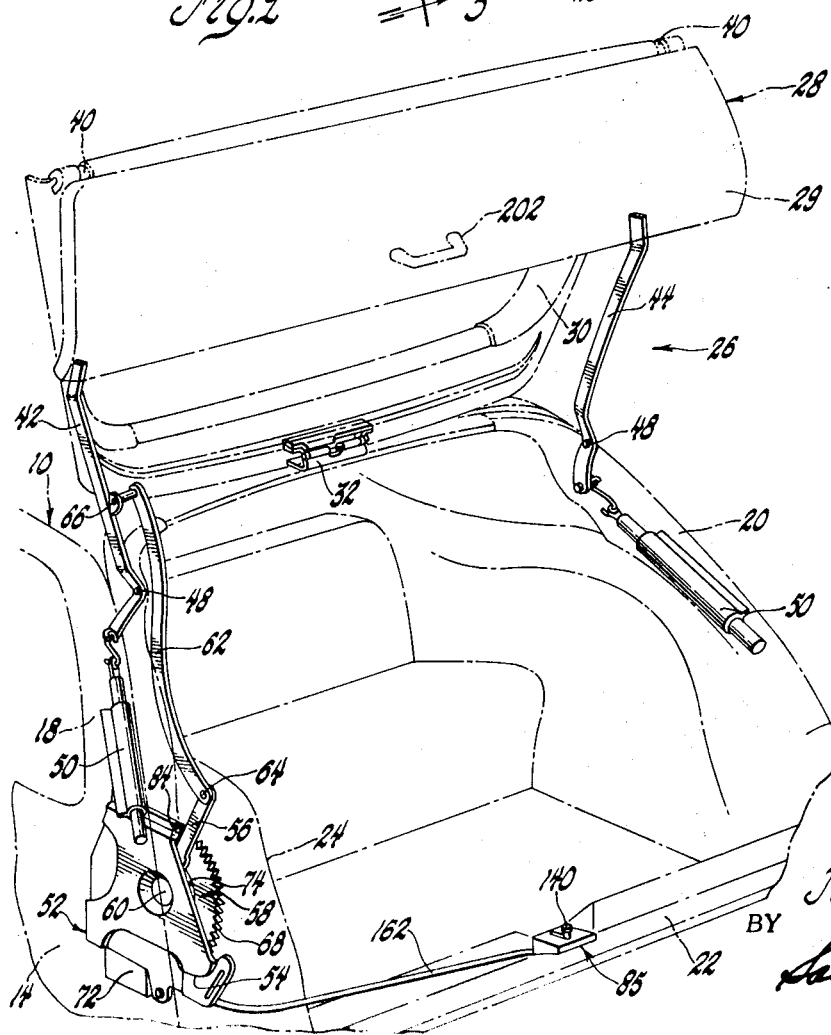
FIG. 2 is similar to FIG. 1 but showing the closure system in an open configuration.

Referring now to FIGS. 1 and 2 of the drawings, thereshown in phantom is the rear portion of a station wagon type vehicle body designated generally 10 including a roof structure 12, a pair of left and right quarter panel structures 14 and 16 and a pair of left and right rear body pillars 18 and 20 interconnecting the roof structure and corresponding ones of the quarter panel structures. The roof structure, the body pillars, and the quarter panel structures cooperate with a laterally extending rear bumper structure 22 in defining a rear opening 24 of the vehicle body. The rear opening 24 is adapted to be closed by a closure system according to this invention and designated generally 26.

As seen best in FIGS. 1, 2 and 3, the closure system 26 includes a closure assembly or tailgate 28 having a lower section 29 and an upper section 30 pivotally supported on the roof structure 12 by a hinge 32. A pair of hinge leaves 36 rigidly attached to the lower section 29 are connected to a corresponding pair of hinge leaves 38 on the upper section 30 by hinge pins 40 so that the lower section is pivotally connected to the upper section. A pair of left and right control arms 42 and 44 are pivotally connected to respective ones of the hinge leaves 36 at 46 and to corresponding ones of the left and right body pillars at 48 intermediate the ends of the control arms. Accordingly, as the upper section 30 is pivoted counterclockwise, FIGS. 1 and 3, from the position thereof corresponding to the closed position of the tailgate, FIG. 1, wherein the upper and lower sections are disposed in generally coplanar relation in the opening 24, toward an open position of the tailgate, FIG. 2, wherein both sections are situated remote from the opening, the lower section 29 is constrained to fold inward under the upper section thereby minimizing the clearance space required behind and above the vehicle.

A pair of spring counterbalance assemblies 50 attached to respective ones of the body pillars are connected to the ends of respective ones of the control arms 42 and 44 which overhang the pivots 48 and function to bias the tailgate toward the open position. The spring force of each counterbalance assembly as well as the lever arm about pivot 48 through which the spring force acts on each of the control arms are calibrated to insure that the tailgate remains in the open position without the requirement of latches or the like.

As best seen in FIGS. 1 through 5, the closure system further includes a closure operator assembly designated generally 52. The operator assembly 52 includes a support plate 54 adapted for rigid attachment by conventional means to the left quarter panel structure 14. A driven arm 56 and a circular driving member 58 are independently pivotally supported on the support plate 54 at 60. The driven arm 56 has one end of an intermediate link 62 pivotally connected thereto at 64, the other end of the intermediate link being pivotally connected to left control arm 42 at 66. Accordingly, as the tailgate is moved between the open and the closed positions the intermediate link 62 effects pivotal movement of the driven arm 56 about the pivot 60 and, conversely, forced pivotal movement of the driven arm effects movement of the tailgate between the open and closed positions.

The driving member 58 has a plurality of gear teeth 68 around the circumference thereof, the gear teeth meshingly engaging a pinion 70 adapted to be driven through a conventional gear train by an electric motor 72 mounted on the support plate 54. The driving member 58 includes an arcuate slot 74 bounded by a pair of terminal or end portions 75 and 76 and a square aperture 77. As best seen in FIG. 4, the square aperture 77 is adapted to receive therein a sensing element 78 projecting from a switch 79 rigidly attached to support plate 54 by a bracket 80. An abutment pin 81 rigidly attached to the driven arm 56 projects generally perpendicularly therefrom into the slot 74 and is adapted to traverse the length of the slot. As seen best in FIG. 12, the motor 72 includes a pair of windings 82 and 83, the winding 82 being adapted to drive the motor in a direction corresponding to clockwise rotation of the pinion 70, FIG. 3, and the winding 83 being adapted to drive the motor in the opposite direction corresponding to counterclockwise rotation of the pinion.

Referring now to FIGS. 3 and 5, the pin and slot connection between the driven arm 56 and the driving member 58 permits randomly interchangeable operation of the tailgate in either the manual mode or the power mode. More particularly, the driving member 58 is normally located in a center position, shown in solid lines in FIG. 3, wherein the slot 74 is disposed generally to the right of pivot 60. The center position of the driving member and the length of slot 74 are predetermined to insure that when the tailgate is in the closed position, FIG. 3, the driven arm 56 is positioned to locate abutment pin 81 adjacent the lower end portion 76 of the slot as shown in solid lines in FIGS. 3 and 5. When the tailgate is opened in the manual mode the driving member 58 is held stationary by deenergized motor 72 and the pinion 70 while the intermediate link 62 pivots the driven arm 56 counterclockwise from the solid line position, FIGS. 3 and 5, through an intermediate position 56' to a position 56'' adjacent a bumper 84 on the support plate 54, the position 56'' corresponding to the open position of the tailgate. The slot 74 accommodates lost motion between the driving member and the driven arm as the pin traverses the length of the slot from the lower end portion 76 to a position adjacent the upper end portion 75. The tailgate may, of course, be lowered in the manual mode merely by reversing the force applied to the tailgate, the lost motion between the driven arm and the driving member again being accommodated by the pin and slot connection therebetween.

For operation of the tailgate in the power mode, one of the windings of the motor 72 is energized to drive pinion 70 in a direction corresponding to the desired movement of the tailgate. More particularly, with the tailgate in the closed position, clockwise rotation of the pinion 70 as a result of energization of winding 82 effects counterclockwise rotation of the driving member 58 from the solid to the broken line position in FIG. 3 which, in turn, results in engagement between the lower end portion 76 of the slot 74 and the abutment pin 81, the abutment pin and the driven arm thereafter being rotated counterclockwise as a unit with the driving member to effect movement of the tailgate from the closed to the open position. Following movement of the tailgate to the open position, in which the latter is held by the counterbalance assemblies 50, the aforementioned control circuit, as described hereinafter, automatically reverses the motor 72 to bring the driving member 58 back to the center position, the abutment pin 81 then being situated adjacent the upper end portion 75 of the slot 74. Movement of the tailgate in the power mode toward the closed position is effected by energization of winding 83 of the motor 72 which rotates the pinion 70 in a counterclockwise direction, FIG. 3, causing engagement between the upper end portion 75 of the slot 74 and the abutment pin 81. It will, of course, be apparent that the pin and slot connection between the driving and driven members, with the driving member always returning to the center position, facilitates randomly interchangeable operation of the tailgate in either the power mode or the manual mode since the tailgate can be moved from one position to the other in one of the two modes and back to the first position in the other mode.

Referring now to FIGS. 3, and 6 through 10, the closure system further includes a striker assembly 85 mounted on the body 10 at the lower margin and in the center of the rear opening, the striker assembly cooperating with a latch assembly 86 mounted within the lower section 29 of the tailgate in securing the latter in the closed position and in effecting tight sealing between the tailgate and the body seals, not shown, during operation of the tailgate in the power mode. As best seen in FIGS. 3 and 10, the latch assembly 86 includes a generally rectangular support plate 87 rigidly attached to the bottom surface of the lower section 29 between an inner panel 88 and an outer panel 90 of the lower section, the support plate having a mouth portion 92 registering with a similar mouth portion in the bottom surface of the lower section and with a cooperating cutout 93 in the inner panel 88. A latch bolt 94 having a keeper arm 96, an actuating surface 98 and a detent shoulder 100 is supported on the plate 87 at 102 for pivotal movement between a latched position, FIG. 10, wherein the keeper arm 96 is disposed across the mouth portion 92 of the support plate and an unlatched position, not shown, wherein the keeper arm is located out of the mouth portion and the actuating surface 98 is disposed therein. A detent lever 104 having a cam surface 106, a retaining shoulder 108, and an upturned arm 110 is supported on the plate 87 at 112 for pivotal movement between a detenting position, FIG. 10, wherein the retaining shoulder 108 engages the detent shoulder 100 on the latch bolt to retain the latter in the latched position, and a releasing position, not shown, pivoted counterclockwise from the detenting position wherein the retaining shoulder is situated remote from the detent shoulder thereby to permit pivotal movement of the latch bolt from the latched to the unlatched position. Both the detent lever and the latch bolt are spring biased by conventional spring means toward the detenting and the unlatching positions, respectively.

As best seen in FIGS. 10 and 11, the detent lever 104 is adapted to be actuated manually or remotely by electrical means. More particularly, a conventional electric solenoid 114 is mounted within the lower section 29 of the tailgate transversely of the vehicle body and has supported thereon an actuator rod 116 having a slot 118 therein. The actuator rod is normally maintained in an extended position, FIG. 11, but is retractable into the solenoid to an actuating position, not shown, upon energization of the solenoid. The upturned arm 110 of the detent lever 104 is freely received within the slot 118 in the actuator rod, the solenoid being positioned relative to the upturned arm such that in the detenting position of the detent lever and the extended position of the rod the upturned arm is situated generally adjacent the outboard end of the slot 118. Accordingly, when the solenoid is energized to bring the rod 116 to the actuating position, the upturned arm is moved from the solid line position shown in FIG. 11 to the broken line position corresponding to the releasing position of the detent lever.

Alternatively, for manual operation, a conventional lock cylinder assembly 120 is secured to the outer panel 90 of the lower section 29 of the tailgate. The rotatable core portion of the lock cylinder assembly, not shown, has attached thereto for unitary rotation therewith a shaft 122, the shaft having rigidly mounted at the distal end thereof a cam 124. The cam 124 is disposed adjacent the upturned arm 110 of the detent lever so that rotation of the shaft 122 and the cam 124 effects movement of the upturned arm from the solid to the broken line position, FIG. 11, thereby to effect movement of the detent lever from the detenting to the releasing position, the lost motion between the upturned arm and the actuator rod 116 being accommodated by the slot 118.

Referring now to FIGS. 6 through 9, the striker assembly 85 includes a mounting plate 126 adapted for rigid attachment to the vehicle body by a plurality of bolts 128 or the like. The mounting plate includes a generally rectangular rearwardly opening slot 130 and a curvilinear slot 132. A carriage 134 including an upper plate 136 and a lower plate 138, FIGS. 6 and 9, is slidably disposed within the slot 130 and rigidly supports a striker pin 140 for bodily movement longitudinally of the body 10 between a center position, shown in solid lines in FIGS. 6 through 9, an extended position 140' rearward of the center position, and a retracted position 140'' forward of the center position, FIG. 7.

As seen best in FIGS. 6 and 9, a lever 142 is pivotally mounted on the plate 126 at 144 and is connected to the carriage 134 by a rivet or pivot pin 146 which secures the upper and lower plates 136 and 138 of the carriage together and extends through an elongated aperture 148 in the lever. When the lever 142 is pivoted about pivot 144 the carriage 134 and the striker pin 140 are moved between the various positions described hereinbefore.

Referring again to FIGS. 6 through 9, pivotal movement of the lever 142 is effected through a power operated screw and nut actuator assembly including a jack screw 150 pivotally supported on a downturned tab portion 152 of the mounting plate 126 at 154 and a power operated nut member 156 threadedly engaging the jack screw 150. A rivet 158 rigidly attached to the top of a strap portion 159 of the power nut member projects upwardly through a generally L-shaped slot 160 in the lever 142 and through the curvilinear slot 132 in the mounting plate 126. From the position of the lever shown in FIG. 6 and corresponding to the center position of the striker pin 140, actuation of the power nut member 156 in one direction effects rightward movement of the latter and the rivet 158 relative to the jack screw 150. Rightward movement of the rivet 158 is, of course, in a path of motion dictated by the right end portion of the curvilinear slot 132. Since the rivet 158 is initially at the end of the short leg portion of L-shaped slot 160 in the lever 142, rightward movement of the rivet effects clockwise pivotal movement of the lever and, consequently, rightward bodily movement of the carriage 134 and the striker pin 140. Conversely, actuation of the power nut member 156 in the opposite direction effects leftward movement of the rivet 158 in a path of motion defined by the left end portion of curvilinear slot 132. As the rivet 158 moves leftwardly, the slight bend in the curvilinear slot 132 causes the rivet to move from the short leg portion of L-shaped slot 160 into the longer leg portion thereof. When the rivet enters the long leg portion of L-shaped slot 160 driving connection between the rivet and the lever 142 is lost so that the lever remains stationary, the slot 160 accommodating lost motion between the rivet and the lever 142. Accordingly, the distance traveled by the striker pin 140 from the center position to the extended position 140' substantially exceeds the distance traveled between the center position and the retracted position 140''. As seen best in FIGS. 2 and 3, the power nut member 156 is connected directly to the electric motor 72 through a flexible rotary cable member 162 which synchronizes movement of the operator and the striker assemblies so that whenever the motor is energized to rotate the driving member 58, the power nut member is also energized to effect simultaneous movement of the striker pin 140.

Referring now to FIG. 12, thereshown is a schematic diagram of the electrical control circuit for the closure system. The control circuit includes, in addition to the switch 79, the solenoid 114, and the windings 82 and 83 of the motor 72, a manually operable electrical switch 164 and a pair of relays 168 and 170 each having a normally open contact 172, a normally closed contact 174, and a holding coil 176. The switch 164 may be conveniently located on the vehicle instrument panel or on the body adjacent the rear opening 24 and includes a movable contactor 178 which is maintained at an electrical potential by a conductor 180 extending between the battery of the vehicle, not shown, and the contactor. The contactor 178 is engageable within the switch on a terminal end of either one of a pair of conductors 182 and 184, the other terminal end of conductor 182 being connected to one side of the normally open contact 172 and the holding coil 176 of relay 170 while the other terminal end of conductor 184 is similarly connected to the holding coil and normally open contact in relay 168. The other side of normally open contact 172 in relay 170 is connected by a conductor 186 to the winding 83 of electric motor 72. Similarly, the other side of normally open contact 172 in relay 168 is connected by a conductor 190 to the winding 82 of electric motor 72. Another conductor 194 connected to the battery of the vehicle and maintained at the electrical potential of the latter serially connects the normally closed contacts in each of the relays 168 and 170 and terminates within switch 79 in electrically conductive engagement with a movable contactor 196.

The contactor 196 is actuated by sensing element 78 so that the switch 79 is responsive to the position of driving member 58. When the driving member moves from the center position thereof in a direction corresponding to opening movement of the tailgate, the sensing element moves the contactor to a position electrically connecting conductor 194 and the winding 83 corresponding to energization of the motor 72 in the opposite or closing direction. Similarly, when the driving member 58 moves from the center position thereof in the direction corresponding to closing movement of the tailgate, the contactor 196 is moved to a position electrically connecting conductor 194 and the winding 82 corresponding to energization of the motor 72 in the opposite or opening direction. The operating coil of the solenoid 114 on the lower section 29 of the tailgate is connected to the conductor 184 by conductor 198.

Describing now the operation of the closure system, in the closed position of the tailgate the driving member 58 is in the center position thereof and driven arm 56 assumes the position shown in solid lines in FIGS. 3 and 5 while the striker pin 140 with the latch bolt 94 retainingly engaged thereon assumes the center position shown in solid lines in FIGS. 6 and 7. To open the tailgate in the manual mode, the operator merely inserts the proper key in the lock cylinder assembly 120 and turns the key thereby to effect movement of the latch bolt 94 from the latched to the unlatched position as described hereinbefore. Subsequently, the operator grasps the handle 202 on the lower section 29 and lifts the tailgate from the closed to the open position while the lost motion between the driven arm 56 and the driving member 58 is taken up in the slot 74. The tailgate is held in the open position by the spring counterbalance assemblies 50 and may be returned to the closed position by reversing the direction of the force applied to the handle 202. As the tailgate approaches the closed position, of course, the striker pin 140 engages the latch 94 on the actuating surface 98 to pivot the bolt from the unlatched to the latched position during which movement the bolt engages the cam surface 106 to cam the detent lever aside so that the retaining shoulder 108 on the detent lever can drop behind the detent shoulder 100 on the latch bolt to maintain the latter in the latched position.

To operate the tailgate in the power mode, the operator manually moves the contactor 178 in switch 164 to a position electrically connecting conductors 180 and 184 thereby to energize the solenoid 114 for effecting movement of the detent lever from the detenting to the releasing position while simultaneously closing the normally open contact 172 and opening the normally closed contact 174 in the relay 168. With the contact 172 closed, the winding 82 of the motor 72 is energized to effect clockwise rotation of the pinion 70 and counterclockwise rotation of the driving member 58. Counterclockwise rotation of the driving member, of course, effects engagement between the lower end portion 76 of the slot 74 and the abutment pin 81 on the driven arm for moving the tailgate to the open position as described hereinbefore. Concurrently, flexible rotary cable member 162 initiates essentially idling movement of the striker pin 140 from the center position thereof to the retracted position 140'' which is achieved when the tailgate reaches the open position.

As the driving member moves out of the center position during opening of the tailgate, the sensing element 78 is cammed out of aperture 77 thereby to connect winding 83 of the motor and conductor 194 through contactor 196. Electrical continuity between the battery and contactor 196 is broken, however, by normally closed contact 174 in relay 168 which is held open by coil 176 as long as switch 164 is being manually actuated so that the opposing winding 83 of the motor remains deenergized.

When the operator senses that the tailgate has reached the open position, either visually or through stalling of the driven arm 56 against the bumper 84, contactor 178 is deactuated thereby to deenergize the coil 176 and open the contact 172 while closing the contact 174 in the relay 168. With the contact 174 closed and the contactor 196 in switch 79 still electrically connecting the conductor 194 and the winding 83 because the driving member is out of the center position, the motor 72 is immediately energized in the reverse direction thus rotating the driving member 58 clockwise back to the center position thereof wherein the contactor 196 is automatically returned to a position disengaged from both of the motor windings 82 and 83 as the sensing element reenters aperture 77 in the driving member. Reverse rotation of the motor 72 also effects return movement of the striker pin 140 from the retracted position 140'' to the center position, FIGS. 6 and 7. Since the driving member 58 is again in the center position thereof, the tailgate may, if desired, be moved from the open to the closed position in the manual mode with the lost between the driven arm 56 and the driving member 58 being taken up in the slot 74.

Alternatively, the tailgate may be moved in the power mode from the open position to a semi-closed position, not shown, slightly displaced from the closed position by bringing the contactor 178 into engagement with the terminal end of conductor 182 thereby to close and open, respectively, the contacts 172 and 174 in the relay 170. With contact 172 closed the winding 83 of the motor is energized to effect counterclockwise rotation of the pinion 70 and clockwise rotation of the driving member 58 thus moving the tailgate toward the closed position. Simultaneously, the striker pin 140 is moved from the center position to the extended position 140', FIG. 7. As the driving member 58 begins clockwise rotation, the contactor 196 of switch 79 electrically connects the opposing winding 82 of the motor to the conductor 194 as the sensing element 78 is cammed out of aperture 77, the connection, however, being interrupted by open contact 174. The semi-closed position of the tailgate is achieved when the operator audibly or visually detects latching engagement between the striker pin 140 and the latch bolt 94 whereupon the contactor 178 in the switch 164 is deactuated and the motor 72 immediately and automatically energized in the opposite direction. With the motor 72 rotating in the opposite direction, the driving member 58 is rotated counterclockwise back to the center position thereof while the striker pin moves from the extended position 140' back to the center position. The return movement of the striker pin functions to forcibly draw the tailgate into the rear opening 24 from the semi-closed to the closed position thereby to effect tight sealing engagement between the tailgate and the seals around the opening. The striker pin 140 and the driving member 58 each achieve their respective center positions at virtually the same instant so that when the sensing element 78 reenters aperture 77 to deenergize the motor 72, the tailgate is sealed in the closed position.

It will be apparent to those skilled in the art that numerous modifications of the closure system according to this invention are possible. One of the most obvious is the addition of extra manually actuated switches in the control circuit. More particularly, a very convenient arrangement incorporates two manual switches, one switch being located on the instrument panel and the other being located on the vehicle body exterior adjacent the rear opening. The two terminal portions of the second switch are connected in parallel with the terminal end portions of conductors 182 and 184 and the contactor of the second switch is maintained at battery potential by any convenient means. In such an arrangement, either switch is effective to operate the tailgate in the power mode.

Having thus described the invention, what is claimed is:

1. In a vehicle body having an opening therein, a closure supported thereon for movement between an open position remote from said opening, a semi-closed position, and a closed position sealingly closing said opening, and counterbalance means between said body and said closure operable to bias said closure toward and to maintain the latter in the open position, the combination comprising, a closure operator on said body movable from a center position in opposite opening and closing directions corresponding respectively to movement of said closure in a power mode toward said open position and toward said closed position, drive means associated with said operator for moving the latter in either one of the opening and the closing directions, manual control means associated with said drive means selectively actuable to effect movement of said operator away from the center position in either one of the opening and the closing directions, combination reversing and stop means associated with said drive means responsive to deactuation of said manual control means to temporarily reverse the direction of movement of said operator for returning the latter to and maintaining the latter in the center position, connecting means between said operator and said closure operative to drivingly connect said closure and said operator during movement of the latter away from the center position in either one of the opening and the closing directions thereby to move said closure in the power mode from the closed to the open position and from the open to the semi-closed position and to effect lost motion between said operator and said closure during movement of the former toward the center position in either one of the opening and the closing directions thereby to permit return of said operator to the center position independently of said closure, said connecting means in the center position of said operator permitting movement of said closure in a manual mode between the open and the closed positions, striker means on said body movable between a center position and an extended position, drive means associated with said striker for moving the latter between the center and the extended positions, synchronizing means between said operator and said striker for synchronizing movement of said striker from the center position to the extended position with movement of said operator away from the center position in the closing direction and from the extended position to the center position with movement of said operator in the opening direction toward the center position thereof, latch means on said closure retainingly engageable on said striker in the extended position of the latter and in the semi-closed position of said closure during movement of said closure in the power mode and engageable on said striker in the center position of the latter and in the closed position of said closure during movement of said closure in the manual mode and actuable to release said striker, movement of said striker from the extended to the center position thereof with said latch means engaged thereon effecting forced movement of said closure from the semi-closed to the closed position, and latch control means operable to effect releasing actuation of said latch means independently of said manual control means to permit movement of said closure in the manual mode and to effect releasing actuation generally simultaneously with actuation of said manual control means thereby to permit movement of said closure in the power mode.

2. In a vehicle body having an opening therein, the combination comprising, a closure assembly including an upper section pivotally supported on said vehicle body adjacent said openings and a lower section pivotally supported on said upper section, link means disposed between said body and said closure assembly adapted to constrain the latter for movement between a closed position wherein said upper and said lower sections are situated in generally coplanar relation in said opening, a semi-closed position, and an open position wherein said upper section is situated remote from said opening and said lower section is folded into juxtaposed relation to said upper section, a closure operator on said body movable from a center position in opposite opening and closing directions corresponding respectively to movement of said closure in a power mode toward said open position and toward said closed position, connecting means between said operator and said link means operative to drivingly connect said link means and said operator during movement of the latter away from the center position in either one of the opening and the closing directions thereby to move said closure in the power mode respectively from the closed to the open position and from the open to the semi-closed position and to effect lost motion between said operator and said link means during movement of said operator toward the center position in either one of the opening and the closing directions thereby to permit return of said operator to the center position independently of said closure, said connecting means in the center position of said operator permitting movement of said closure in a manual mode between the open and the closed positions, striker means on said body movable longitudinally between a center position and an extended position, a reversible electric motor supported on said body, combination driving and synchronizing means drivingly connecting said motor with each of said operator and said striker and operative in response to energization of said motor to synchronize movement of said striker from the center position to the extended position with movement of said operator away from the center position in the closing direction and from the extended position to the center position with movement of said operator in the opening direction toward the center position thereof, manual control means associated with said electric motor selectively actuable to energize said motor for effecting movement of said operator away from the center position in either one of the opening and the closing directions, combination reversing and stop means associated with said electric motor responsive to deactuation of said manual control means for reversing the direction of movement of said operator to return the latter to the center position and for deenergizing said motor for maintaining said operator in the center position, latch means on said closure retainingly engageable on said striker in the extended position of the latter and in the semi-closed position of said closure during movement of said closure in the power mode and engageable on said striker in the center position of the latter and in the closed position of said closure during movement of said closure in the manual mode and actuable to release said striker, movement of said striker from the extended to the center position thereof with said latch means engaged thereon effecting forced movement of said closure from the semi-closed to the closed position, and latch control means operable to effect releasing actuation of said latch means independently of said manual control means to permit movement of said closure in the manual mode and to effect releasing actuation generally simultaneously with actuation of said manual control means thereby to permit movement of said closure in the power mode.

* * * * *